United States Patent
Royer et al.

(10) Patent No.: US 12,523,342 B2
(45) Date of Patent: Jan. 13, 2026

(54) LIQUEFIED GAS SOLUTION CONTAINER APPARATUS AND METHOD FOR DISPENSING

(71) Applicant: SOUTH 8 TECHNOLOGIES, INC., San Diego, CA (US)

(72) Inventors: James Royer, San Diego, CA (US); Cyrus S. Rustomji, San Diego, CA (US); Jungwoo Lee, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 19/171,257

(22) Filed: Apr. 5, 2025

(65) Prior Publication Data
US 2025/0230901 A1 Jul. 17, 2025

Related U.S. Application Data

(63) Continuation of application No. 18/900,288, filed on Sep. 27, 2024, now Pat. No. 12,297,964, which is a continuation of application No. 18/807,938, filed on Aug. 17, 2024, now abandoned, which is a continuation of application No. PCT/US2023/028105, filed on Jul. 19, 2023.

(60) Provisional application No. 63/391,220, filed on Jul. 21, 2022.

(51) Int. Cl.
*F17C 7/02* (2006.01)

(52) U.S. Cl.
CPC ........ *F17C 7/02* (2013.01); *F17C 2205/0326* (2013.01); *F17C 2223/0153* (2013.01); *F17C 2223/033* (2013.01); *F17C 2227/0337* (2013.01); *F17C 2250/032* (2013.01); *F17C 2250/0439* (2013.01); *F17C 2250/0631* (2013.01); *F17C 2250/0636* (2013.01)

(58) Field of Classification Search
CPC .......................... F17C 7/02; F17C 2223/0153
See application file for complete search history.

(56) References Cited

U.S. PATENT DOCUMENTS

2020/0203703 A1* 6/2020 Royer .................. H01M 10/63

\* cited by examiner

*Primary Examiner* — Paul J Gray
(74) *Attorney, Agent, or Firm* — Manuel de la Cerra

(57) ABSTRACT

Methods and structures are disclosed to dispense a liquefied gas solution from a liquefied gas solution (LGE) container. The LGE container comprises a temperature sensor to detect the temperature of the liquefied gas solution within the LGE container. The LGE container temperature is controlled using a temperature control element and a processor connected to the temperature sensor and to the temperature control element. The LGE is transferred from the container into a secondary container through a valve. The method includes the following steps: (a) opening the valve to allow the LGE to flow from the LGE container into the secondary container; (b) taking readings from the temperature sensor; and (c) based on the temperature readings, heating the LGE container to maintain the temperature of the LGE container at a predetermined temperature or within a predetermined temperature range.

9 Claims, 14 Drawing Sheets

(Setup 100-1)

(Setup 100-1)

(Setup 100-2)

(Setup 100-3)

(Setup 100-4)

(Setup 100-5)

(Setup 100-6)

(Setup 100-7)

(Setup 100-8)

(Setup 100-9)

(Setup 100-10)

(Setup 100-11)

(Setup 100-12)

(Setup 100-13)

(Setup 100-14)

LIQUEFIED GAS SOLUTION CONTAINER APPARATUS AND METHOD FOR DISPENSING

CROSS-REFERENCE TO RELATED APPLICATIONS

This application claims priority as a divisional application of U.S. Ser. No. 18/900,288, entitled "LIQUEFIED GAS ELECTROLYTE CONTAINER APPARATUS AND METHOD FOR DISPENSING", which claims priority as a continuation of U.S. application Ser. No. 18/807,938, entitled "LIQUEFIED GAS ELECTROLYTE CONTAINER APPARATUS AND METHOD FOR DISPENSING" and filed on Aug. 17, 2024, which claims priority as a continuation of PCT application PCT/US23/28105, entitled "LIQUEFIED GAS ELECTROLYTE CONTAINER APPARATUS AND METHOD FOR DISPENSING" and filed on Jul. 19, 2023, which in turn claims priority to U.S. Provisional Application 63/391,220 filed Jul. 21, 2022 and titled "LIQUEFIED GAS ELECTROLYTE CONTAINER APPARATUS AND METHOD FOR DISPENSING". These applications are incorporated by reference in their entireties.

This application is related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; U.S. Pat. No. 11,049,668 issued Jun. 29, 2021; U.S. Pat. No. 11,342,615 issued on May 24, 2022; U.S. Pat. No. 10,784,532 issued on Sep. 22, 2020; U.S. Pat. No. 11,984,614 issued on May 14, 2024; U.S. Pat. No. 11,958,679 issued on Apr. 16, 2024; PCT/US22/31594 filed on May 31, 2022; PCT/US23/17720 filed on Apr. 6, 2023; PCT/US23/28104 filed on Jul. 19, 2023; PCT/US23/28105 filed on Jul. 19, 2023; PCT/US24/16784 filed on Feb. 21, 2023; PCT/US24/18746 filed on Mar. 6, 2024; PCT/US24/33428 filed on Jun. 11, 2024; PCT/US24/25771 filed on Apr. 23, 2024; PCT/US24/31912 filed on May 31, 2024; U.S. Application 63/534,213 filed on Aug. 22, 2023; U.S. Application 63/418,703 filed on Oct. 24, 2022; PCT/US24/27501 filed on May 2, 2024; PCT/US24/31325 filed on May 29, 2024; U.S. Application 63/652,616 filed on May 28, 2024; PCT/US24/40203 filed on Jul. 30, 2024; U.S. application Ser. No. 18/788,809 filed on Jul. 30, 2024; U.S. application Ser. No. 18/643,134 filed on Apr. 23, 2024; U.S. application Ser. No. 18/807,938 filed Aug. 17, 2024; and U.S. Application 63/684,297 filed on Aug. 16, 2024.

STATEMENT REGARDING FEDERALLY SPONSORED R&D

None.

FIELD OF THE INVENTION

Embodiments of the invention relate to an apparatus and method for mass delivery of liquefied gas solvent for the preparation of electrochemical energy storage devices.

BACKGROUND

Preparation of liquefied gas electrolytes (LGE) requires accurate and efficient flow control mechanisms. Temperature monitoring of the LGE container may enable efficient and accurate flow control during the preparation processes. Flow control is commonly achieved using electronic mass flow controllers (MFCs). MFCs, however, are typically not configured in flow systems to utilize temperature feedback from the source or from the receiving containers.

If the LGE container temperature increases during the preparation of LGE, a backpressure that exceeds the MFC's operation window could negatively impact the flow rate or the accuracy of the MFC. These effects may impact the performance of electrochemical devices fabricated using liquefied gas solvents.

The prior art has demonstrated that the performance of electrochemical devices are greatly affected by the mass and composition of the electrolyte. Deviations in the mass of electrolyte can negatively impact the performance of electrochemical devices. For instance, too little electrolyte may not allow full utilization of all the electrode capacity within the device. Furthermore, too much electrolyte lowers the energy density of the electrochemical device through an increase in mass. Similarly, deviations in the composition of electrolyte can negatively impact the performance of electrochemical devices. For instance, inaccurate ratios of one electrolyte component to another may not allow full utilization of all the electrode capacity within the device.

It is therefore necessary to prepare an electrochemical device with an accurate electrolyte mass and composition to match specified energy densities. A need exists for an apparatus and method utilizing temperature feedback to improve accuracy and efficiency during the LGE preparation process.

SUMMARY

Methods and structures are disclosed to fill a container with a liquefied gas solvent that has a vapor pressure above an atmospheric pressure of 100 kPa at a room temperature of 293.15 K. The method includes providing a fill setup that has a mass flow controller (MFC), a liquefied gas solvent source connected to the MFC, and a container connected to the MFC, wherein the container comprises a salt and a temperature sensor to detect the temperature of the liquefied gas solution when present in the container. A processor connected to the MFC and to the temperature sensor is used to receive temperature readings from the temperature sensors and to actuate the flow rate on the MFC. The flow rate is adjusted to maintain temperature readings from the temperature sensor below a predetermined maximum temperature. The liquefied gas solvent mixes with the salt in the container to form a liquefied gas electrolyte.

The method may include pre-loading the container with a non-salt component.

The method may include setting a predetermined maximum temperature for the temperature sensor and adjusting the flow rate on the MFC to maintain temperature readings below the predetermined maximum temperature.

Methods and structures are disclosed to dispense a liquefied gas solution from a LGE container. The LGE comprises a liquefied gas solvent having a vapor pressure above 100 kPa at a temperature of 293.15 K and a salt. The container comprises a temperature sensor to detect the temperature of the liquefied gas solution within the liquefied gas solution container. The container temperature is controlled using a temperature control element and a processor connected to the temperature sensor and the temperature control element. The LGE is transferred from the container to a secondary container through a valve. The method includes the following steps: (a) opening the valve to allow liquefied gas solution to flow from the liquefied gas solution container into the secondary container; (b) taking readings from the temperature sensor; and (c) based on the temperature readings, heating the liquefied gas solution container to maintain the temperature of the liquefied gas solution container at a predetermined temperature or within a predetermined temperature range.

The method may include a secondary container which is an electrochemical device. The setup may include electrochemical devices such as a battery or capacitor.

The method may include a predetermined temperature range for the container of 303.15 K+/−2 K. Similarly, the method may include a predetermined temperature range for the secondary container of 293.15 K+/−5 K.

These methods and apparatuses may be used to transfer the liquefied gas electrolyte or a liquefied gas solution.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

DETAILED DESCRIPTION

Figure 1:
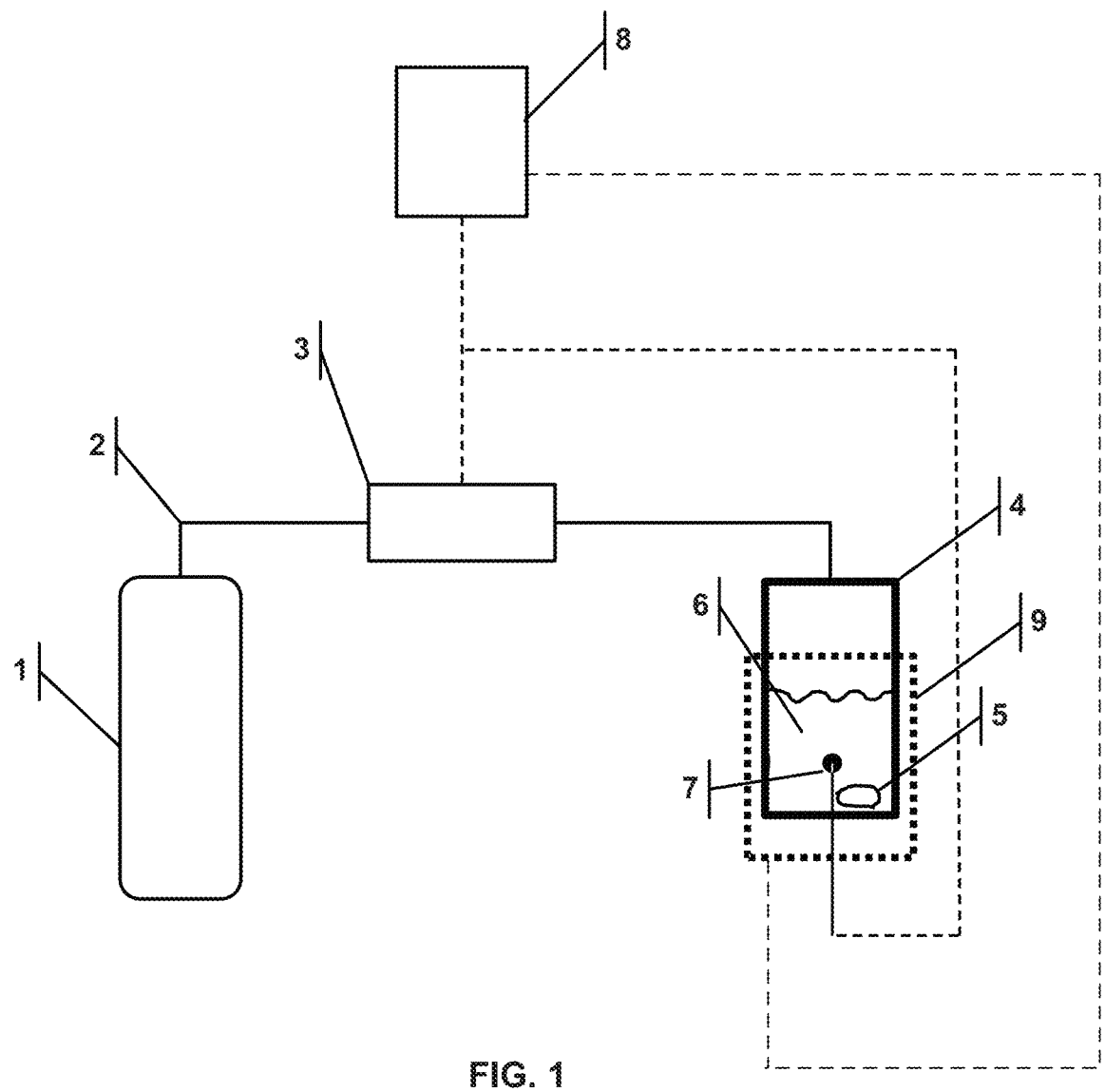
FIG. 1 is a block diagram showing an embodiment of the apparatus for liquefied gas solvent delivery to a container.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

1—Source cylinder
2—Tubing
3—Mass Flow Controller
4—Container
5—Salt
6—Liquefied Gas Solution
7—Temperature Sensor
8—Processor
9—Heat Sink 10—Isolation Valve
11—Downstream Isolation Valve
12—Container Isolation Valve
13—Waste Volume
14—Pressure Transducer
15—Evacuation Valve
16—Vacuum Pump
17—Temperature Control Element
18—Temperature Control Element
19—Temperature Control Element
20—Heat Exchanger
21—Gas Delivery Line
22.1—Liquefied Gas Solvent Source 22.1
22.$x$—Parallel Liquefied Gas Solvent Sources
23.1—Gas Delivery Line
23.$x$—Parallel Gas Delivery Lines
24—Secondary Container
25—Temperature Control Element
26—Loading Volume
27—Loading Volume Isolation Valve
28—Temperature Sensor
29—Heat Sink
30—Temperature Sensor
31—Liquid Mass Flow Controller
32—Isolation Valve
33—Dip Tube
34—Isolation Valve
35—Reservoir
36—Temperature Sensor
37—Isolation Valve
38—Isolation Valve
39—Temperature Control Element The proposed novel methods of LGE preparation use a container with a temperature sensor to detect the temperature of the liquefied gas solution within the container. The proposed setup for LGE preparation includes a liquefied gas solvent source, a flow controller, a container containing a salt, a temperature sensor to detect the temperature of the LGE, and a processor connected to both the temperature sensor and flow controller. During LGE preparation, the liquefied gas solvent flow rate is controlled using a mass flow controller, and the flow rate is set by a processor connected to the flow controller. The processor is also connected to the temperature sensor, which monitors the temperature of the LGE during the liquefied gas solvent fill step.

In some embodiments, the container may be initially cooled to a temperature lower than the temperature of the liquefied gas solvent source. As the liquefied gas solvent fills the container, significant heat may be released to the container and cause the temperature of the LGE to increase. If the LGE temperature increases, the vapor pressure inside the container may exceed the backpressure limits of the mass flow controller and compromise the MFC accuracy.

To mitigate the rate of heating due to liquefied gas solvent filling, the processor may reduce the MFC flow rate. The processor may use temperature feedback from the temperature sensor and may adjust the MFC flow rate to ensure that the backpressure on the MFC is not exceeded. The processor may optimize the MFC flow rate during liquefied gas solvent filling to minimize the time required to prepare the LGE.

EXAMPLE EMBODIMENTS

What follows are 4 non-limited examples showing various embodiments of the present invention. One such embodiment is illustrated in FIG. 1. In setup 100-1, the liquefied gas is supplied by a liquefied gas solvent source 1 (shown throughout this disclosure as a cylinder 1). The liquefied gas solvent may include one or more of the following; fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, molecular oxygen, molecular nitrogen, carbon monoxide, carbon dioxide, sulfur dioxide, dimethyl ether, nitrous oxide, nitrogen dioxide, nitrogen oxide, carbon disulfide, hydrogen fluoride, hydrogen chloride, combination thereof, and isomers thereof. The components of the gas delivery apparatus are connected by metal, plastic, or ceramic tubing 2. In some embodiments, the components of the gas delivery apparatus are connected by tubing or piping of variable size. In some embodiments, the tubing may be 1/16-inch, 1/8-inch, 1/4-inch, 1/2-inch, 1-inch, or 2-inch outer diameter. In some embodiments, the pipe size may be 1/8, 1/4, 1/2, 1, 2 or greater nominal pipe size.

The vapor of the liquefied gas solvent is passed through a mass flow controller (MFC) 3. The MFC 3 may include, but is not limited to, thermal type flow controllers or Coriolis type flow controllers. The MFC 3 has an upstream pressure P1 and a downstream pressure P2. Sufficient pressure difference between the P1 and P2 is necessary for accurate MFC 3 operations as discussed herein. The upstream pressure P1 is the operating pressure of MFC 3. The downstream pressure P2 is approximately 15 pounds per square inch less than P1. In preferred embodiments the pressure difference P1-P2 can be greater than 0.1 psi, preferably greater than 1 psi, more preferably greater than 10 psi. The vapor of the liquefied gas solvent is transferred through the MFC 3 into the container 4 where it mixes with salt 5 to form a liquefied gas solution 6. The container 4 may be any suitable metal, ceramic, or plastic apparatus capable of holding a liquefied gas solution that has a vapor pressure above an atmospheric pressure of 100 kPa at a temperature of 293.15 K. The container 4 may be any suitable size for containing the LGE. In some embodiments the container 4 may be larger than 1 cubic centimeter, larger than 10 cubic centimeters, larger than 100 cubic centimeters, larger than 1000 cubic centimeters, larger than 10000 cubic centimeters, larger than 100000 cubic centimeters, or larger than 1000000 cubic centimeters. The salt 5 may include one or more of lithium bis(trifluoromethanesulfonyl)imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato) borate (LiBOB), lithium hexafluorostannate, lithium difluoro (oxalato) borate (LiDFOB), lithium bis(fluorosulfonyl)imide (LiFSI), lithium aluminum fluoride (LiAlF3), lithium nitrate (LiNO3), lithium chloroaluminate, lithium tetrafluoroborate (LiBF4), lithium tetrachloroaluminate, lithium difluorophosphate, lithium tetrafluoro (oxalato) phosphate, lithium difluorobis(oxalato)phosphate, lithium borate, lithium oxolate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium di-ketosuccinate or any corresponding salts with the positive charged lithium cation substituted for sodium or magnesium or any combinations thereof. Further useful salts include those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium, N,N-diethyl-N-methyl-N(2methoxyethyl) ammonium, N,N-Diethyl-N-methyl-N-propylammonium, N,N-dimethyl-N-ethyl-N-(3-methoxypropyl) ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalate) borate, bis(trifluoromethanesulfonyl)imide, bromide, chloride, dicyanamide, diethyl phosphate, hexafluorophosphate, hydrogen sulfate, iodide, methanesulfonate, methyl-phophonate, tetrachloroaluminate, tetrafluoroborate, and trifluoromethanesulfonate, combinations thereof, and isomers thereof.

The temperature of the LGE is detected using a temperature sensor 7. The temperature sensor 7 may be enclosed in any suitable feedthrough housing, such as a dip tube. The temperature sensor 7 may be any sensor capable of a wide dynamic range, such as a thermocouple. In some embodiments, the temperature sensor 7 may be a resistive based sensor, a semiconductor-based sensor, or a thermistor. The temperature sensor 7 is connected to a processor 8. The processor 8 provides an initial flow rate setting on the MFC 3 and continuously monitors the flow rate during the liquefied gas solvent filling process. The processor 8 also monitors the temperature of the LGE via the temperature sensor 7 and adjusts the flow rate of MFC 3 if the temperature of the LGE 8 increases above a predetermined maximum temperature. One of ordinary skill in the art will recognize that the predetermined maximum temperature will correlate with a specific vapor pressure of the LGE 8. The LGE 8 vapor pressure may be the same as the downstream pressure P2. Therefore, the predetermined maximum temperature of the LGE 8 may correspond to a predetermined pressure difference P1-P2, as discussed above. The container 4 may be in contact with a heat sink 9 that is connected and regulated by the processor 8. One of ordinary skill in the art will recognize that maintaining the container 4 at a temperature lower than that of the source 1 will allow condensation of the liquefied gas solvent into container 4. Heat sink 9 may be connected to a refrigeration unit so that container 4 can be cooled below room temperature. Container 4 may be cooled to less than 50 degrees Celsius, preferably to less than 25 degrees Celsius, more preferably to less than 0 degrees Celsius, even more preferably to less than −20 degrees Celsius. Heat sink 9 may comprise a thermally conductive material in contact with the container 4. Heat sink 9 may be, but is not limited to, a solid container, a bed of metal shot, a liquid bath, an ice bath, a dry ice bath, or a gas flow. The refrigeration unit may be, but is not limited to, a circulating chiller, Peltier cooler, or a refrigerated gas. Container 4 may also be pre-cooled below the liquefied gas solvent source 1 temperature to enable condensation of liquefied gas into the container 4. In a preferred embodiment of this invention, container 4 is maintained at temperatures below the liquefied gas solvent source 1 temperature.

Figure 2:
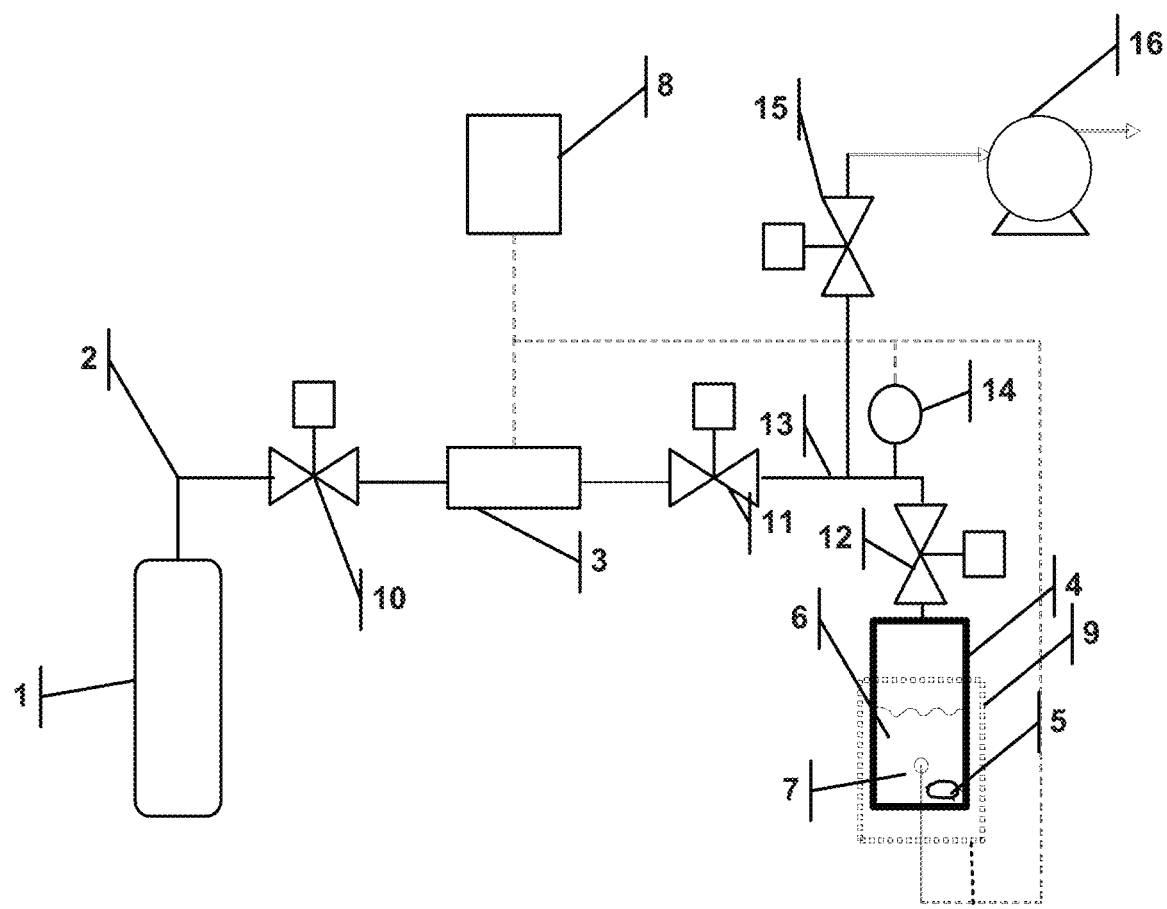
FIG. 2 is a block diagram showing an embodiment of the apparatus for liquefied gas solvent delivery to a container, which includes additional pressure and flow control components.

Another embodiment of this invention is illustrated in FIG. 2. In setup 100-2, the liquefied gas solvent is supplied from a liquefied gas solvent source 1. The vapor of the liquefied gas solvent is passed through an upstream isolation valve 10, the mass flow controller 3, a downstream isolation valve 11, and a container isolation valve 12. The section of tubing between the downstream isolation valve 11 and the container isolation valve 12 is defined as the waste volume 13, which has a pressure transducer 14 connected to processor 8 to monitor the pressure. One of ordinary skill in the art will recognize that the pressure monitor can be used to calculate the density of the vapor in waste volume 13. The mass of vapor in waste volume 13 can be calculated and accounted for when delivering liquefied gas solvent into container 4. When container 4 has been filled, container isolation valve 12 is closed, and waste volume 13 is evacuated through evacuation valve 15 and pump 16. Accounting for the waste volume 13 may improve the accuracy of the liquefied gas solvent delivery to the container 4.

Figure 3:
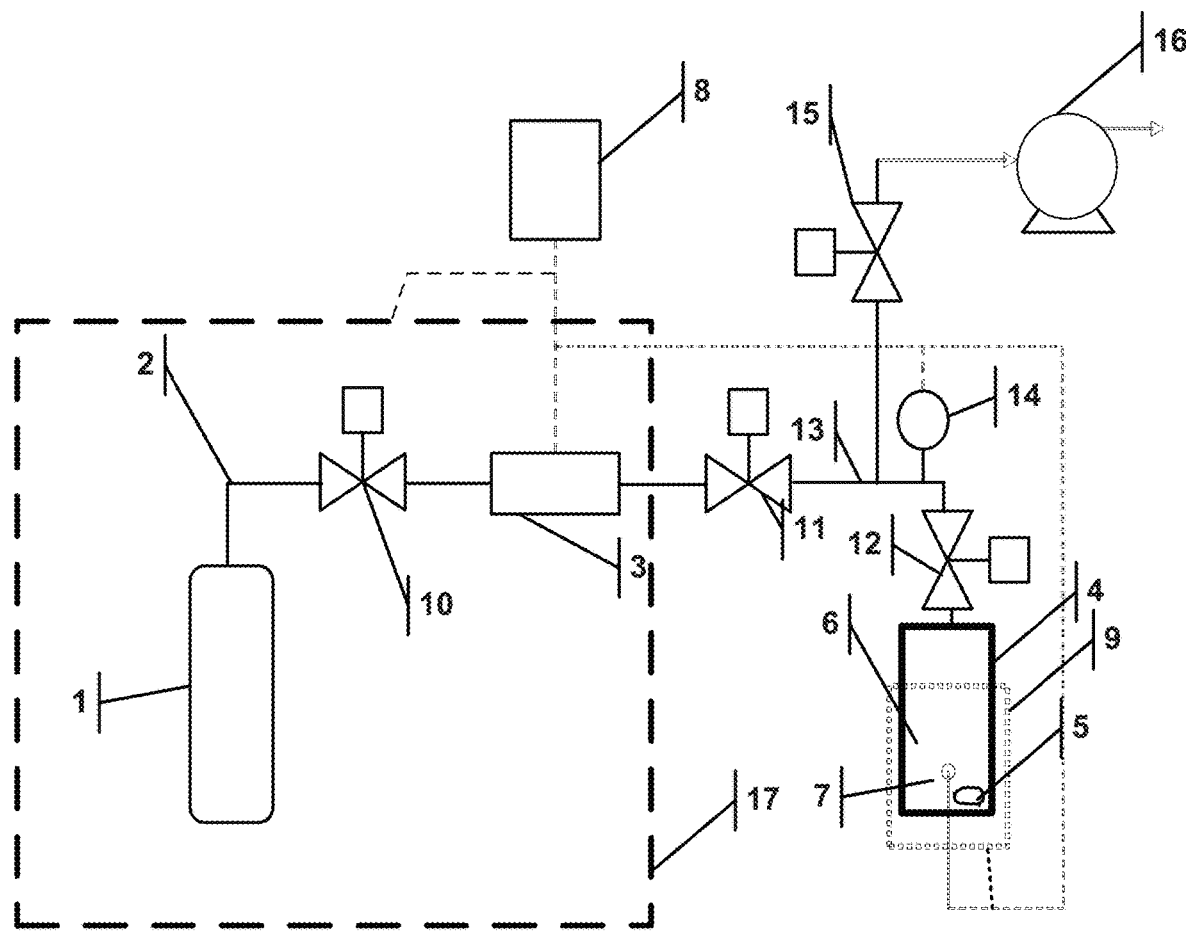
FIG. 3 is a block diagram showing an embodiment of the apparatus for liquefied gas solvent delivery to a container, where the liquefied gas solvent source and/or the gas delivery line are temperature controlled.

Another embodiment of this invention is illustrated in FIG. 3. In setup 100-3, the temperature of the liquefied gas solvent source 1, isolation valve 10, tubing 2, and MFC 3 are controlled by a temperature control element 17 that may be connected to the processor 8, and may further comprise a temperature sensor. In one embodiment, the temperature deviation between the liquefied gas solvent source 1 and the gas delivery lines is less than 10 degrees Celsius, preferably less than 5 degrees Celsius, more preferably less than 1 degree Celsius, even more preferably less than 0.1 degrees Celsius. The temperature may be controlled to be higher than room temperature. The temperature may be controlled between −30 degrees Celsius and 100 degrees Celsius, preferably between 0 degrees Celsius and 50 degrees Celsius, more preferably between 20 degrees Celsius and 30 degrees Celsius. The processor may control the temperature control element 17 to maintain a variance of temperature to within +/−2.0 degrees Celsius, and more preferably to within 0.5 degrees Celsius during the fill process. As the liquefied gas solvent source 1 delivers gas during the fill process, it will cool, and the variation in temperature of the gas may affect the accuracy of the MFC 3. By using a temperature control element 17 to maintain a near constant temperature during the fill process, the inaccuracies of the MFC 3 can be minimized. Those skilled in the art recognize that the temperature of the liquefied gas solvent source 1 may be adjusted to provide sufficient vapor pressure and flow rate. The temperature control element 17 may be, but is not limited to: heating blankets, heating tape, heating rope, or thermally regulated enclosures.

Figure 4:
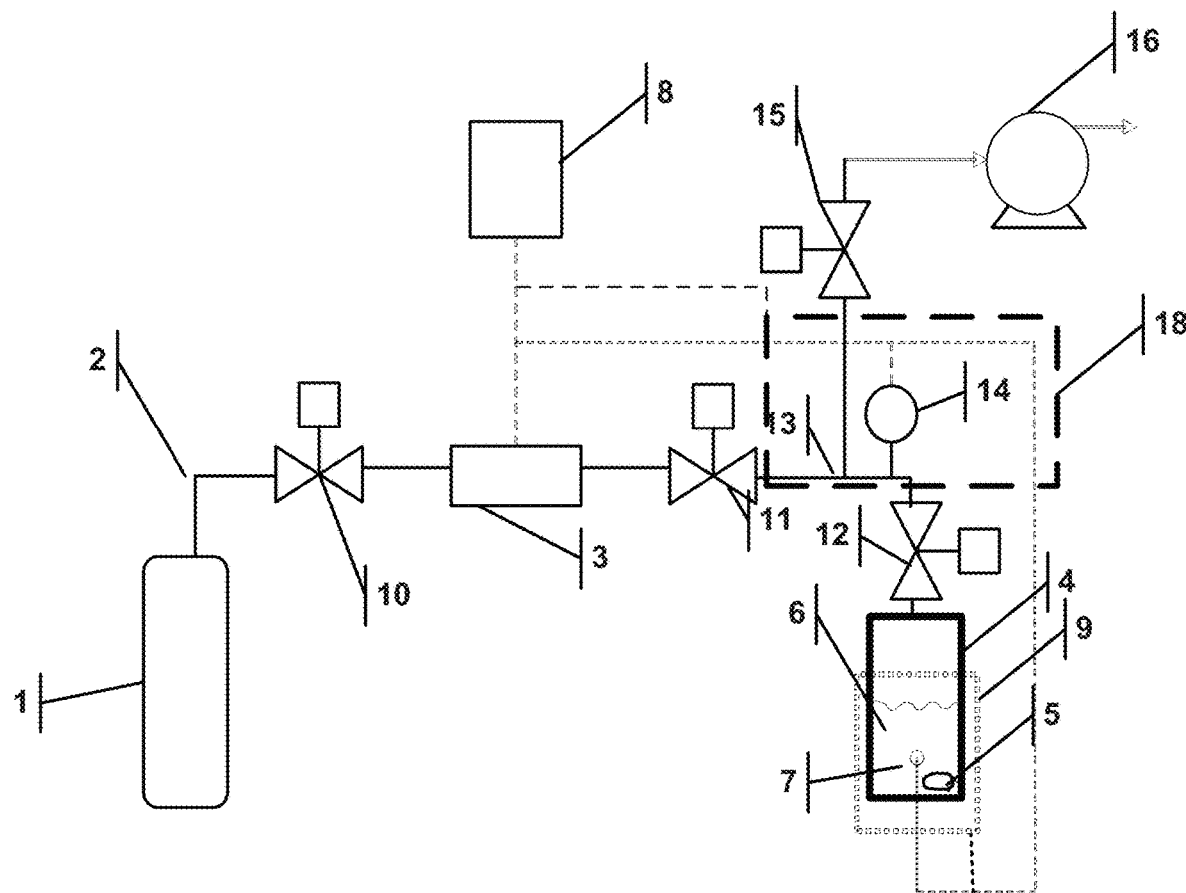
FIG. 4 is a block diagram showing an embodiment of the apparatus for liquefied gas solvent delivery to a container, where the gas line between the valve and the container is temperature controlled.

Another embodiment of this invention is illustrated in FIG. 4. In setup 100-4, the downstream side of valve 11 (which is also the waste volume) is temperature-controlled using a temperature control element 18 (that may be connected to the processor 8, and may further comprise a temperature sensor). The temperature may be controlled between −30 degrees Celsius and 100 degrees Celsius, preferably between 0 degrees Celsius and 50 degrees Celsius, more preferably between 20 degrees Celsius and 30 degrees Celsius. The temperature control element 18 may be, but is not limited to: heating blankets, heating tape, heating rope, or thermally regulated enclosures. The temperature control element 18 (through the processor 8) may maintain a variance of temperature within the waste volume to within +/−2.0 degrees Celsius, and more preferably to within 0.5 degrees Celsius. The temperature control element 18 may be set to a certain preset temperature, and that set temperature can be used, along with the pressure reading from the pressure sensor 14, to determine the gas mass in the waste volume. This method may further improve the accuracy of liquefied gas solvent delivery to container 4.

Figure 5:
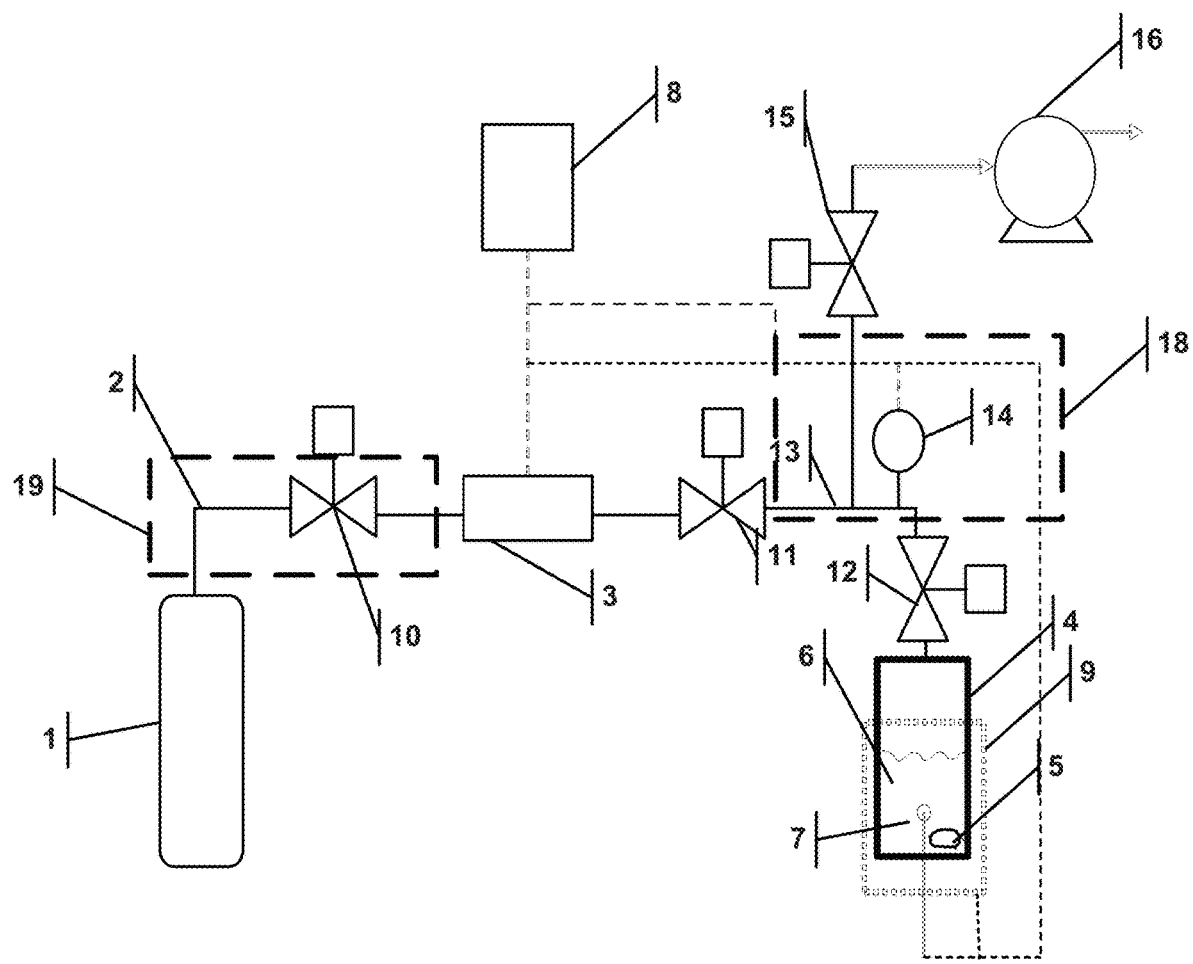
FIG. 5 is a block diagram showing an embodiment of the apparatus for liquefied gas solvent delivery to a container, where the gas line between the source cylinder and the mass flow controller is temperature controlled.

Another embodiment of this invention is illustrated in FIG. 5. In setup 100-5, the temperature of isolation valve 10 and tubing 2, between liquefied gas solvent source 1 and MFC 3, are controlled by a temperature control element 19 (that may be connected to the processor 8, and may further comprise a temperature sensor). One of ordinary skill in the art will recognize that the temperature between gas outlet of liquefied gas solvent source 1 and MFC 3 may be adjusted to be higher than that of the liquefied gas solvent source 1 to prevent condensation of liquefied gas. The temperature control element 19 may be, but is not limited to: heating blankets, heating tape, heating rope, or thermally regulated enclosures.

Figure 6:
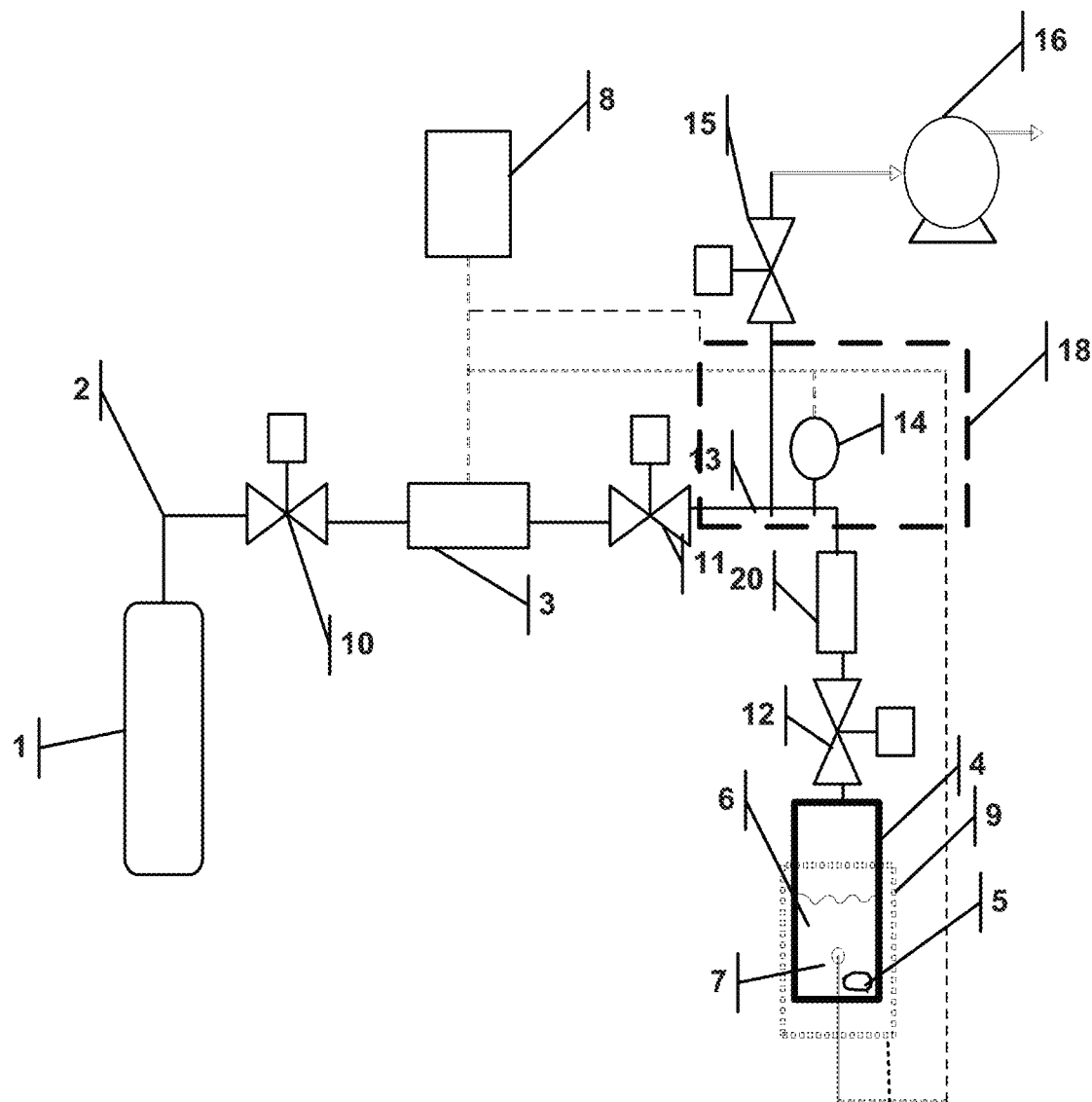
FIG. 6 is a block diagram showing an embodiment of the apparatus for liquefied gas solvent delivery to a container, where a heat exchanger is used to cool the gas entering the container.

Another embodiment of this invention is illustrated in FIG. 6. In setup 100-6, there is a heat exchanger 20 upstream of container 4. The heat exchanger 20 cools the incoming gas to container 4. The heat exchanger may cool the gas to less than 50 degrees Celsius, less than 20 degrees Celsius, less than 0 degrees Celsius, less than negative 20 degrees Celsius, less than negative 40 degrees Celsius or less than negative 60 degrees Celsius. The gas condenses above container 4 and flows into container 4 to mix the salt 5 and form LGE 6. One of ordinary skill in the art will recognize that use of heat exchanger 20 may improve the collection of condensed liquefied gas solvent into container 4.

Figure 7:
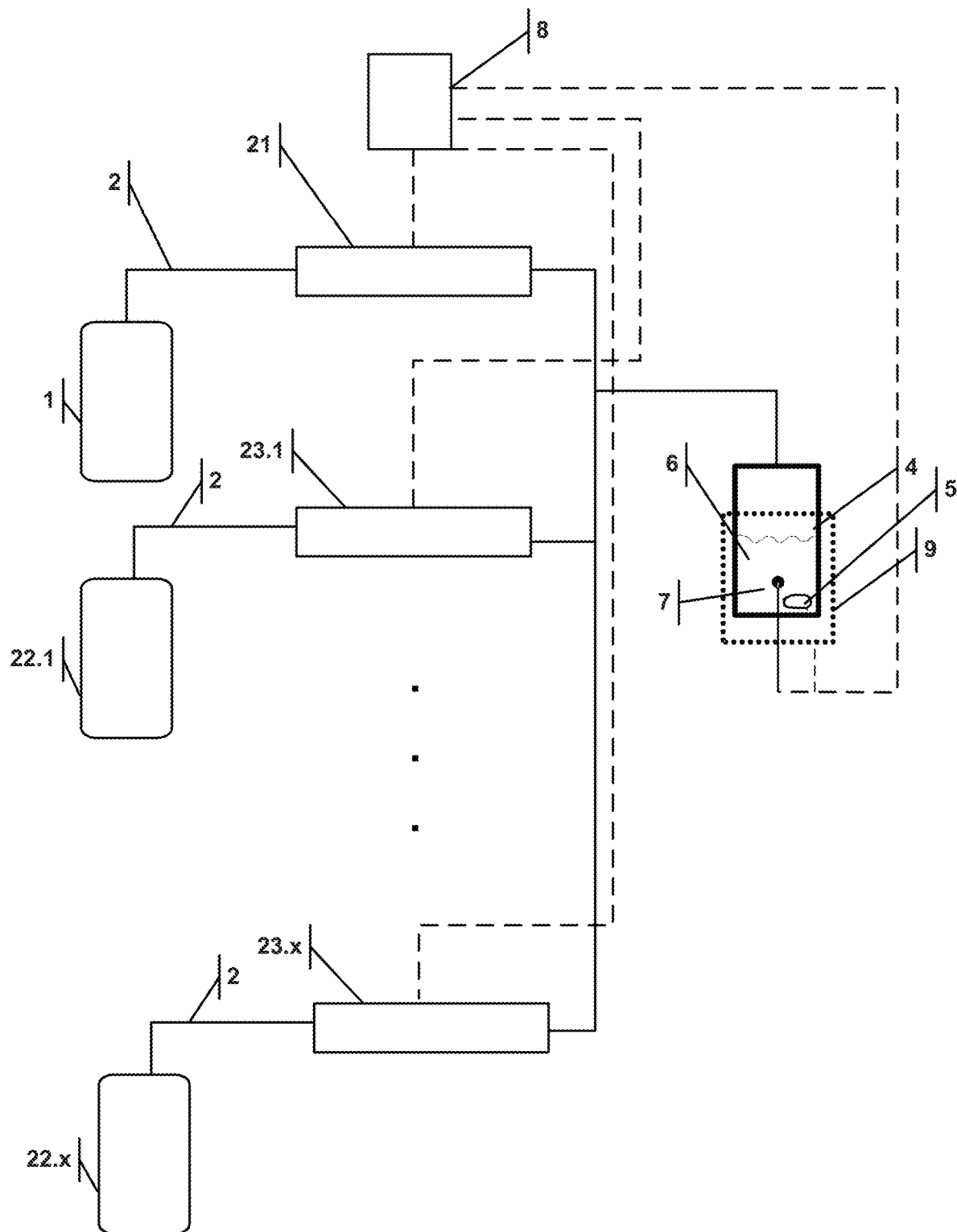
FIG. 7 is a block diagram showing an embodiment of the apparatus for liquefied gas solvent delivery to a container, where two or more liquefied gas solvent sources are connected in parallel with the container.

Another embodiment of this invention is illustrated in FIG. 7. The setup 100-7 comprises of two or more parallel gas delivery lines supplying liquefied gas solvent to the container 4. Liquefied gas solvent source 1 is connected to gas delivery line 21, and liquefied gas solvent source 22.1 is connected to gas delivery line 23.1, and both gas delivery lines 21 and 23.1 are delivering gas to the container 4. This embodiment may be extended to any plurality of liquefied gas solvent sources and gas delivery lines (shown as liquefied gas solvent sources 22.x and gas delivery lines 23.x, all of which connect and deliver gas to container 4). The gas delivery lines may comprise of the components of any of the above embodiments for delivering accurate masses of liquefied gas solvent at the desired flow rates. The different gasses may be delivered to container 4 simultaneously or in series.

Figure 8:
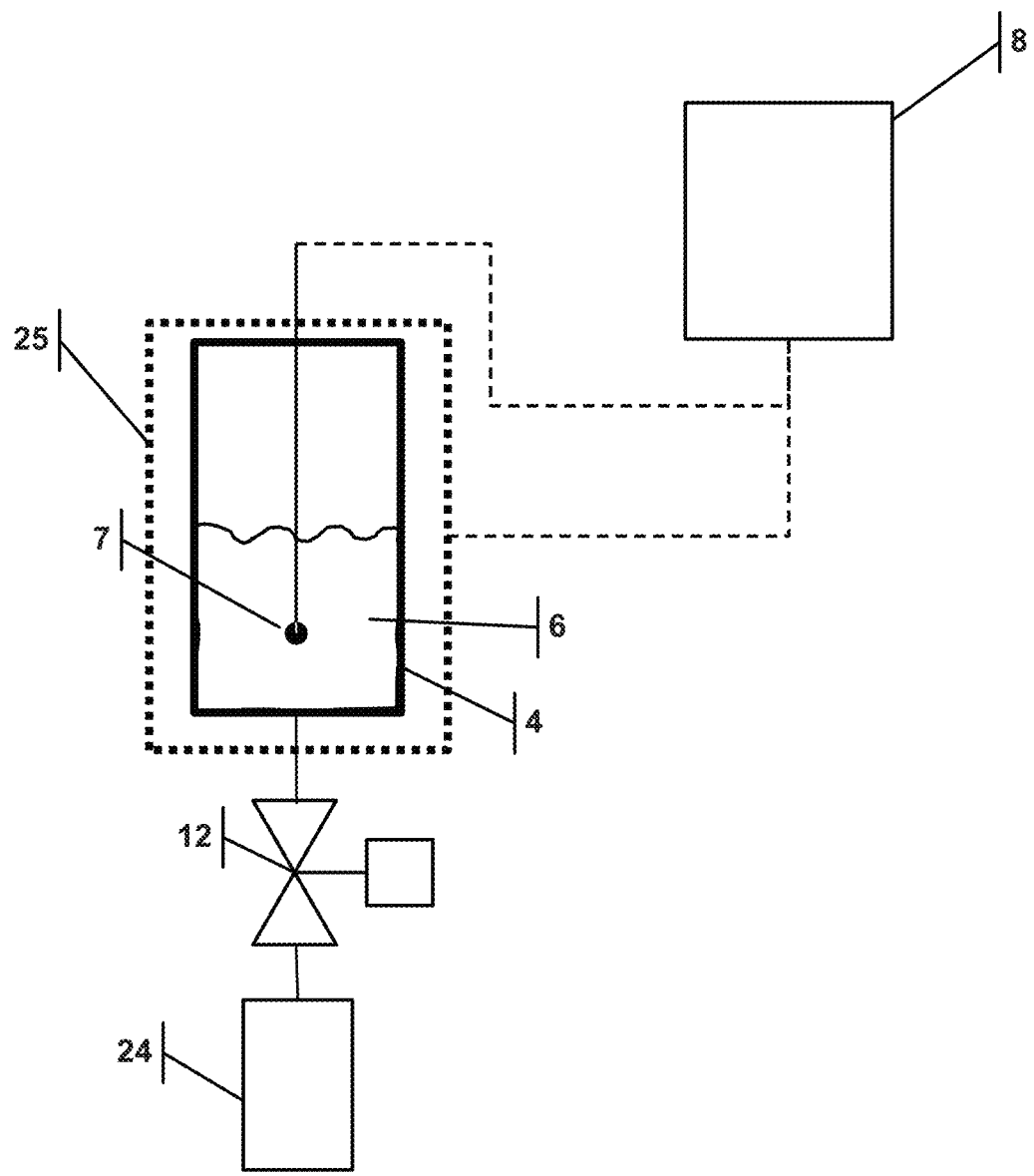
FIG. 8 is a block diagram showing an embodiment of the apparatus for liquefied gas solution dispensing to a secondary container.

Another embodiment of this invention is illustrated in FIG. 8. In setup 100-8, the container 4, container isolation valve 12, liquefied gas solution 6, and temperature sensor 7 are used for dispensing LGE 6 into a secondary container 24. The secondary container 24 may be any suitable metal, ceramic, or plastic apparatus capable of holding a liquefied gas solution that has a vapor pressure above an atmospheric pressure of 100 kPa at a temperature of 293.15 K. Secondary container 24 may be an electrochemical device, such as a battery or capacitor. When the container isolation valve 12 opens, the LGE 6 flows from container 4 to secondary container 24. Processor 8 monitors temperature sensor 7 and controls temperature control element 25. One of ordinary skill in the art will recognize that as the liquid volume in container 4 decreases during the filling process, vaporization of the LGE 6 occurs into the headspace of container 4. This vaporization process removes heat from the LGE 6 surroundings and may lower the temperature of the LGE 6. If the LGE 6 temperature decreases, the LGE density may change and reduce the accuracy of the mass of LGE transferred into the secondary container 24. The headspace vapor pressure of the LGE may also be reduced if the LGE temperature decreases. The apparatus may use a pressure differential between the container 4 and the secondary container 24 to facilitate LGE transfer. If the headspace vapor pressure is reduced, the LGE transfer efficiency may be reduced. Therefore, a temperature control element 25 is used to provide heat to container 4 to maintain a constant temperature. The temperature may be controlled between-30 degrees Celsius and 100 degrees Celsius, preferably between 20 degrees Celsius and 50 degrees Celsius, more preferably between 30 degrees Celsius and 40 degrees Celsius. The temperature control element 25 may be, but is not limited to: heating blankets, heating tape, heating rope, or thermally regulated enclosures. The temperature control element 25 may maintain a variance of temperature within the container to within +/−2.0 degrees Celsius, and more preferably to within 0.5 degrees Celsius.

Figure 9:
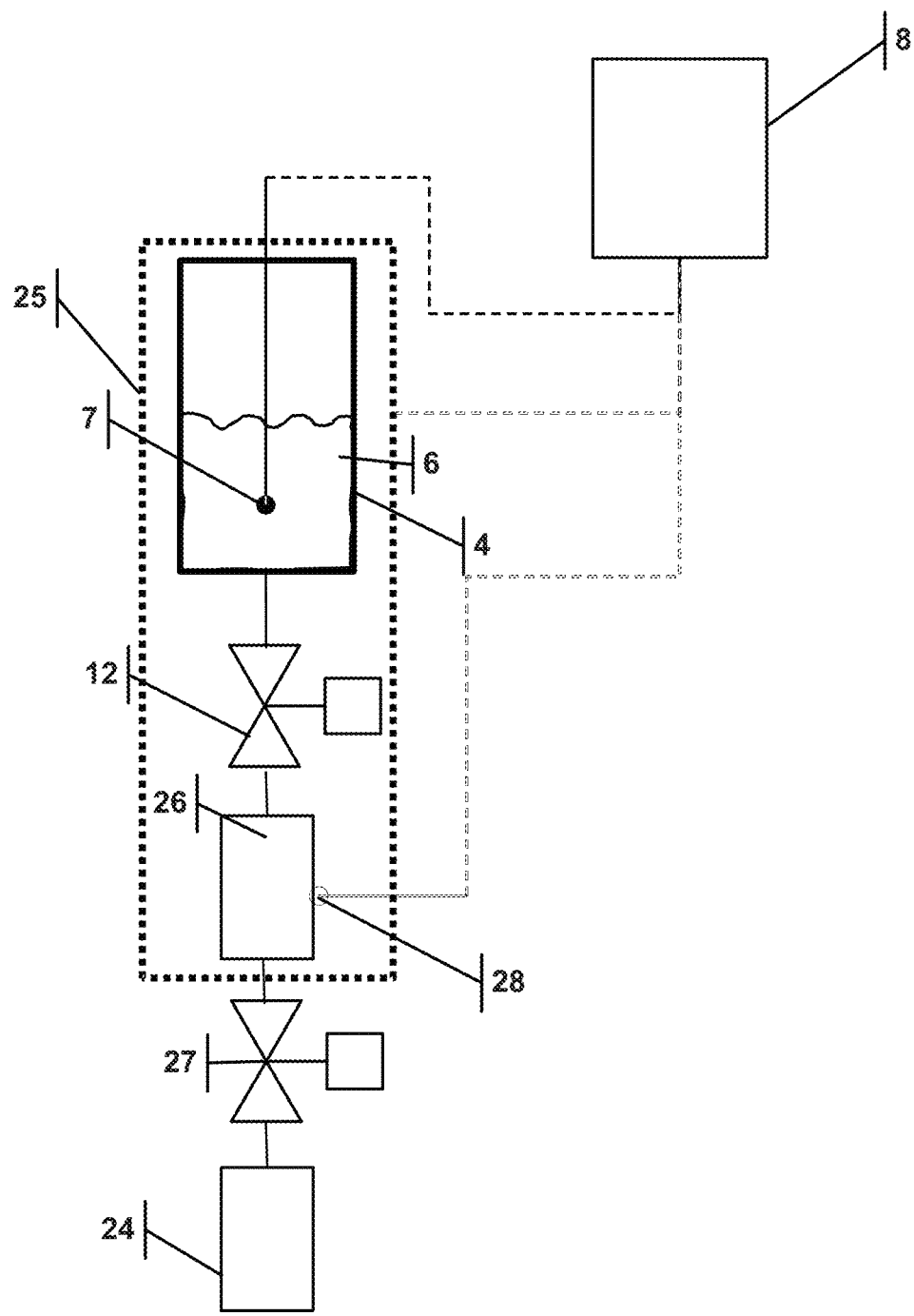
FIG. 9 is a block diagram showing an embodiment of the apparatus for liquefied gas solution dispensing to a secondary container, which includes a loading volume.

Another embodiment of this invention is illustrated in FIG. 9. In setup 100-9, the container 4 dispenses LGE 6 into an intermediate container, referred to as a loading volume 26. LGE 6 is transferred from container 4 when the container isolation valve 12 is opened to the loading volume 26. During this step, isolation valve 27 is closed, and LGE 6 completely fills loading volume 26. The isolation valve 12 is then closed. In a subsequent step, the loading volume isolation valve 27 opens, and the loading volume 26 dispenses LGE 6 into the secondary container 24. The loading volume 26 may be any suitable metal, ceramic, or plastic apparatus capable of holding a liquefied gas solution that has a vapor pressure above an atmospheric pressure of 100 kPa at a temperature of 293.15 K. The loading volume 26 may be constructed to a predetermined volume to dispense an accurate mass of LGE 6 into the secondary container 24. A temperature sensor 28 is connected to the loading volume 26 and to the processor 8 to monitor the temperature. One of ordinary skill in the art will recognize that both the container 4 and the loading volume 26 should be maintained at the same temperature to have a uniform density within the LGE 6. A known, uniform density of the LGE 6 may be required for accurate mass delivery of LGE 6 into the secondary container 24. Therefore, a temperature control element 25 is used to maintain a constant, uniform temperature in the container 4 and the loading volume 26. The temperature may be controlled between-30 degrees Celsius and 100 degrees Celsius, preferably between 20 degrees Celsius and 50 degrees Celsius, more preferably between 30 degrees Celsius and 40 degrees Celsius. The temperature control element 25 may be, but is not limited to, heating blankets, heating tape, heating rope, or thermally regulated enclosures. The temperature control element 25 may maintain a variance of temperature within the container to within +/−2.0 degrees Celsius, and more preferably to within 0.5 degrees Celsius.

The flow of LGE 6 from the loading volume 26 into the secondary container 24 may be facilitated by a pressure differential. The secondary container 24 may initially be evacuated to a pressure below 14.7 psi, at a room temperature of 293.15 K. When the loading volume isolation valve 27 opens, the LGE 6 will dispense into secondary container 24 and will partially vaporize in the secondary container headspace. To achieve efficient flow of LGE 6 into the secondary container 24, loading volume 26 may be heated to a higher temperature than that of the secondary container 24, so that the vapor pressure within the loading volume 26 is always higher than the vapor pressure in the secondary container 24. In one embodiment, the temperature difference between the loading volume 26 and secondary container 24 is greater than 1 degree Celsius, preferably greater than 5 degrees Celsius, more preferably greater than 10 degrees Celsius.

Figure 10:
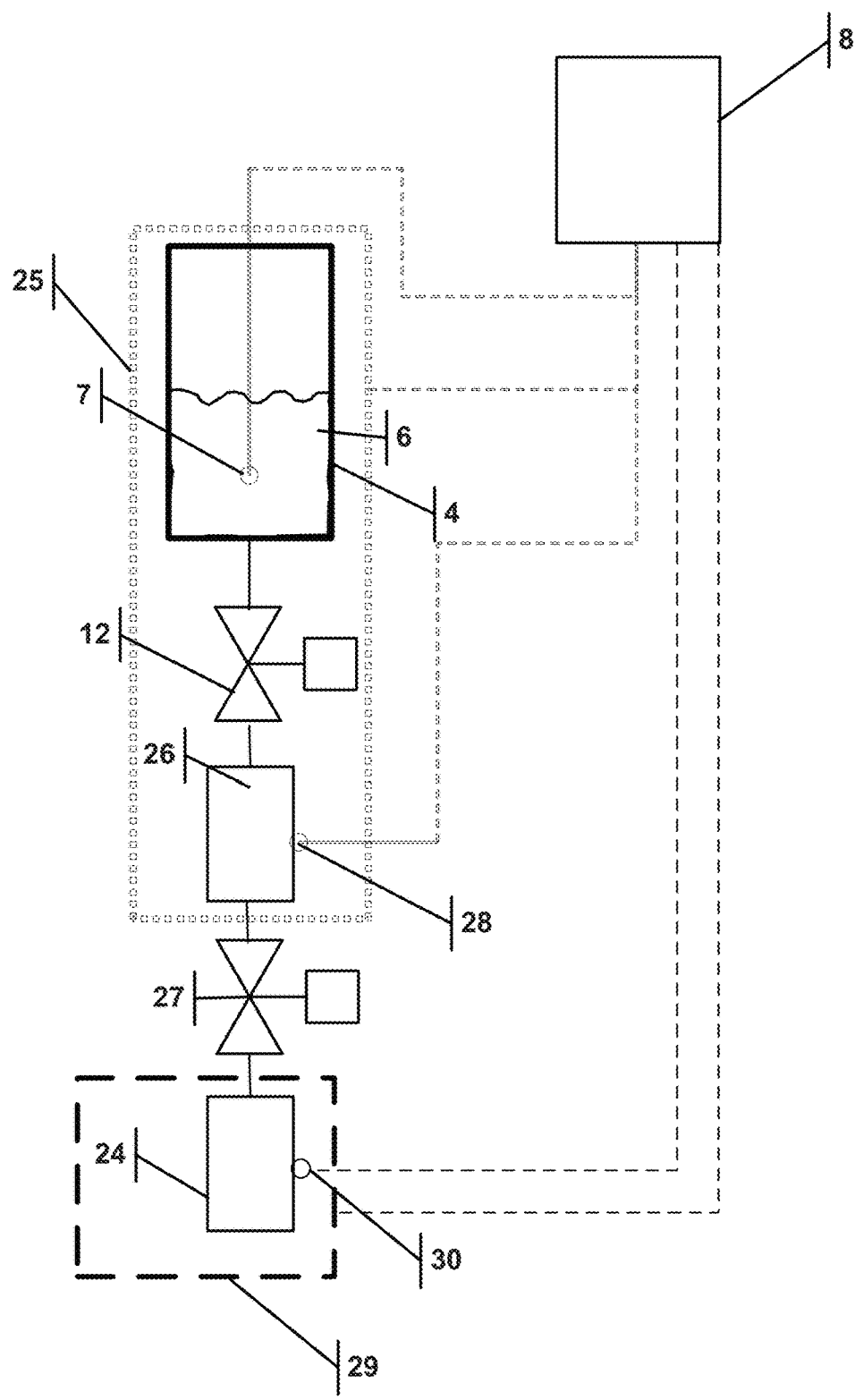
FIG. 10 is a block diagram showing an embodiment of the apparatus for liquefied gas solution dispensing to a secondary container, where the secondary container is cooled using a heat sink.

Another embodiment of this invention is illustrated in FIG. 10. In setup 100-10, the secondary container 24 has a heat sink 29 and a temperature sensor 30, both of which are connected to the processor 8. The heat sink 29 may be used to remove heat from the secondary container 24 as it is filled with LGE 6 so that the secondary container 24 maintains a constant temperature during the LGE 6 fill process. The heat sink 29 may be used to maintain the temperature difference between loading volume 26 and secondary container 24 as discussed above. Temperature sensor 30 may be connected to processor 8 so that processor 8 can monitor the temperature difference between loading volume 26 and secondary container 24, and can regulate the heat sink as necessary.

Figure 11:
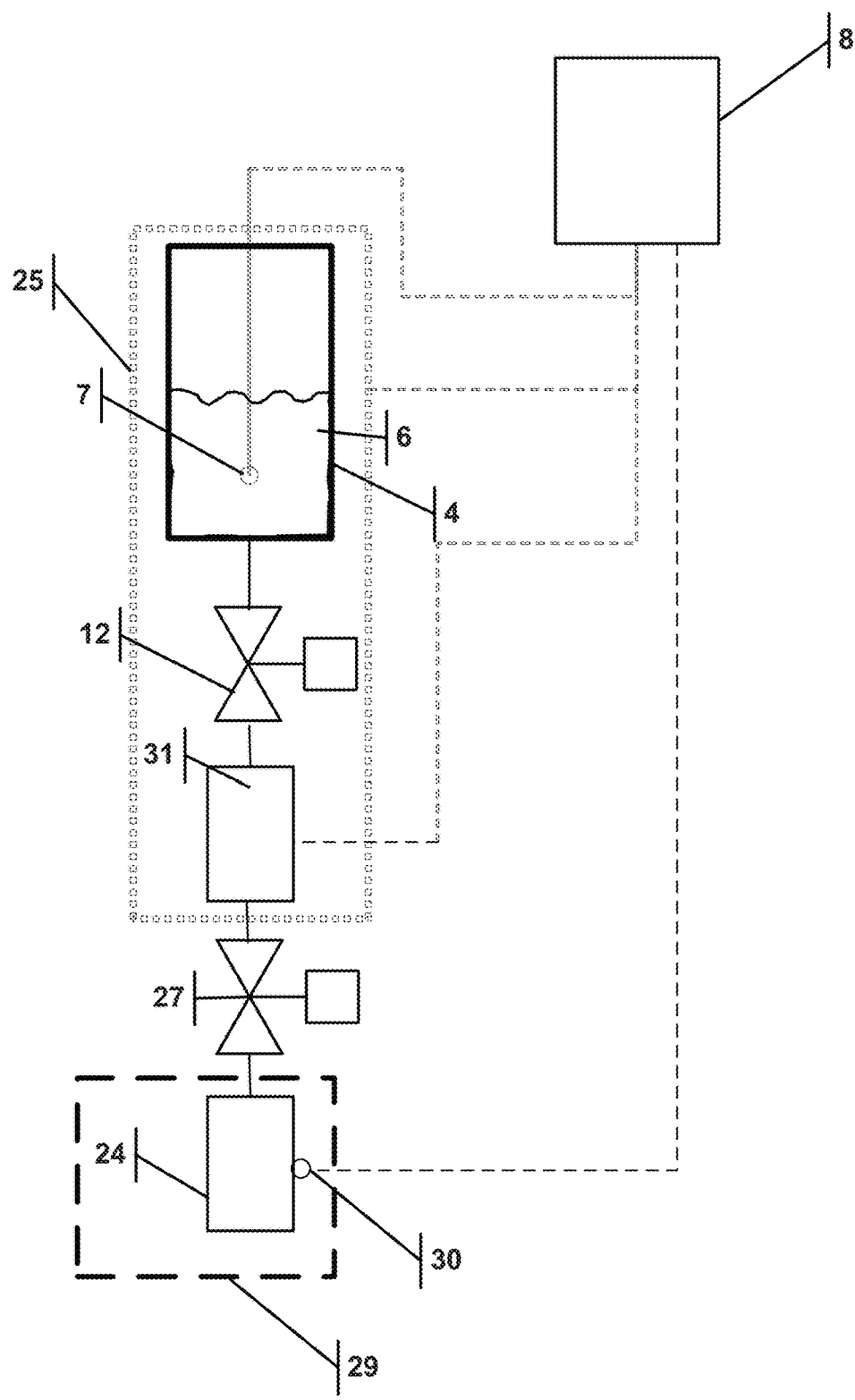
FIG. 11 is a block diagram showing an embodiment of the apparatus for liquefied gas solution dispensing to a secondary container, where the liquefied gas flow is controlled using a liquid mass flow controller.

Another embodiment of this invention is illustrated in FIG. 11. In setup 100-11, a liquid mass flow controller 31 is used to transfer LGE 6 from container 4 into secondary container 24. Liquid mass flow controller 31 may be a thermal, Coriolis, magnetic inductive, or vortex type. Liquid mass flow controller 31 may be connected to processor 8 so that a predetermined mass of LGE 6 may be input to processor 8 and automatically dispensed using the liquid mass flow controller 31.

Figure 12:
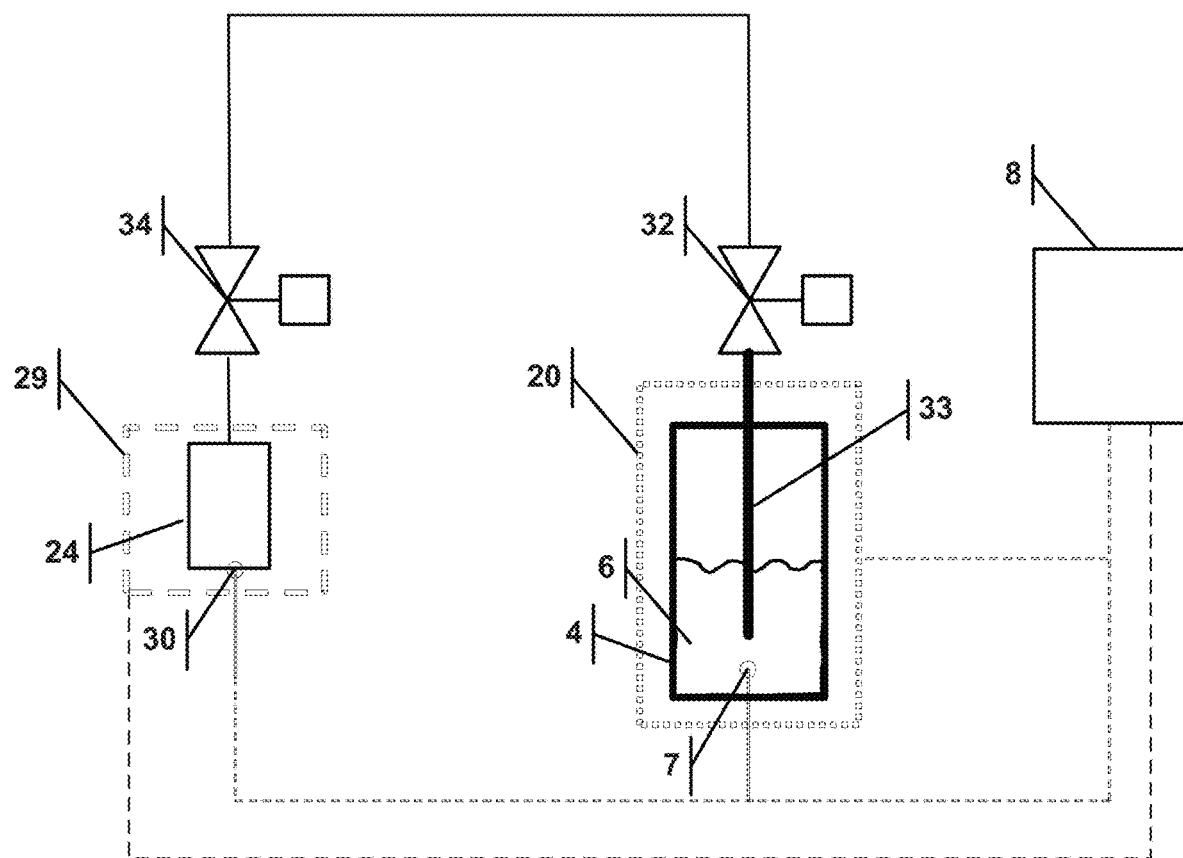
FIG. 12 is a block diagram showing an embodiment of the apparatus for liquefied gas solution dispensing to a secondary container, where the liquefied gas solution is dispensed through a dip tube.

Another embodiment of this invention is illustrated in FIG. 12. In setup 100-12, the apparatus is oriented so that the container isolation valve 32 is above the container 4, and a dip tube 33 extends from the container isolation valve 32 into the LGE 6. LGE 6 is transferred through dip tube 33, through the container isolation valve 32, through valve 34, and into secondary container 24. LGE 6 may be transferred from the container 4 to the secondary container 24 by utilizing a pressure differential between the two containers. Therefore, a temperature control element 35 is used to maintain a constant, uniform temperature in container 4, and a heat sink 36 is used to remove heat from secondary container 24. The secondary container 24 may initially be evacuated to a pressure below 15 psi, at a room temperature of 293.15 K. The processor 8 may receive temperature measurements from the temperature sensor 7 and may regulate the temperature control element 20 so that the temperature of the container 4 and the LGE 6 are maintained at a predetermined set point. The processor may also regulate the heat sink 29 based on readings from a temperature sensor 30. One of ordinary skill in the art will recognize that having the container 4 at a higher temperature than that of the secondary container 24 will result in a greater pressure in the container 4 than in the secondary container 24 and will facilitate the LGE 6 to flow from the container 4 into the secondary container 24. The temperature of the container 4 may be controlled between-30 degrees Celsius and 100 degrees Celsius, preferably between 20 degrees Celsius and 50 degrees Celsius, more preferably between 30 degrees Celsius and 40 degrees Celsius. The temperature control element 20 may be, but is not limited to: heating blankets, heating tape, heating rope, or thermally regulated enclosures. The temperature control element 20 may maintain a variance of temperature within the container to within +/-2.0 degrees Celsius, and more preferably to within 0.5 degrees Celsius. The heat sink 29 on the secondary container 24 may be connected to a refrigeration unit so that the secondary container 24 can be cooled to room temperature or below. The secondary container 24 may be cooled to less than 50 degrees Celsius, preferably to less than 25 degrees Celsius, more preferably to less than 20 degrees Celsius. The heat sink 29 may comprise a thermally conductive material in contact with the secondary container 24. The heat sink 29 may be, but is not limited to: a solid container, a bed of metal shot, a liquid bath, an ice bath, a dry ice bath, or a gas flow. The refrigeration unit may be, but is not limited to, a circulating chiller, Peltier cooler, or a refrigerated gas. In one embodiment, the temperature difference between container 4, and secondary container 24 is greater than 1 degree Celsius, preferably greater than 5 degrees Celsius, more preferably greater than 10 degrees Celsius. In a preferred embodiment of this invention, the secondary container 24 is maintained at temperatures near room temperature, 20 degrees Celsius. The temperature of secondary container 24 may be monitored by a temperature sensor 30 connected to processor 8.

Figure 13:
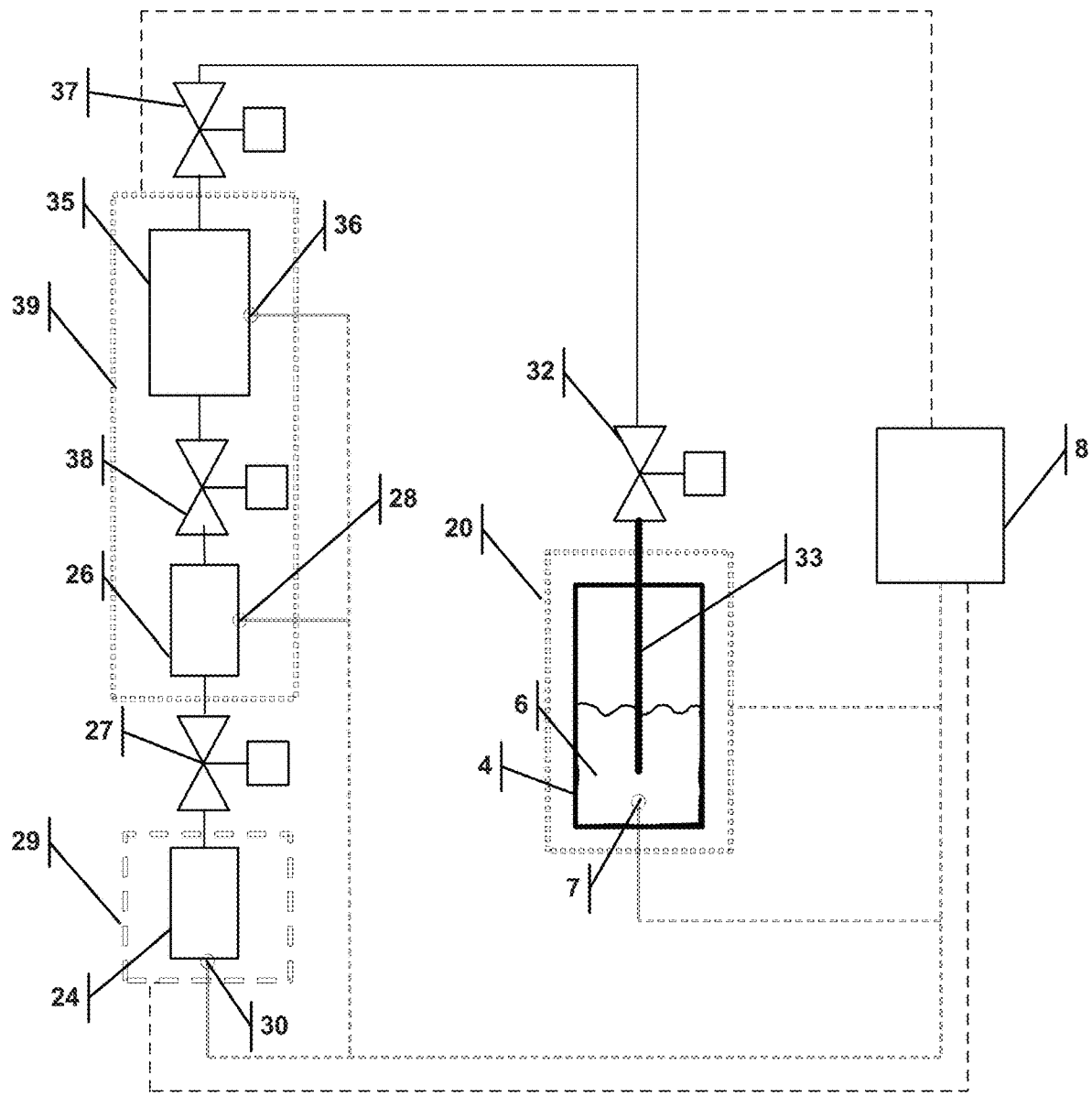
FIG. 13 is a block diagram showing an embodiment of the apparatus for liquefied gas solution dispensing to a secondary container, where a temperature-controlled reservoir is filled prior to the secondary container.

Another embodiment of this invention is illustrated in FIG. 13. In setup 100-13, the apparatus includes a reservoir 35 with a temperature sensor 36, a valve 37 isolating the reservoir from the tubing connected to valve 12 and container 4, a loading volume 26 with a temperature sensor 28, a valve 38 separating the reservoir 38 loading volume 26, and a temperature control element 39. The reservoir 35 is filled with LGE 6 from container 4 using a similar method as discussed above. The temperature of the reservoir 35 and that of the loading volume 26 is maintained below the temperature of the container 4 to facilitate the LGE 6 to flow with a pressure difference. The temperature control element 39, temperature sensor 28, and temperature sensor 36 are connected to processor 8 to maintain a temperature less than that of the temperature sensor 7. In preferred embodiments, the temperature difference is greater than 1 degree Celsius, greater than 5 degrees Celsius, or greater than 10 degrees Celsius. In preferred embodiments, the temperature of reservoir 35 and that of the loading volume 26 is controlled between −30 degrees Celsius and 100 degrees Celsius, preferably between 20 degrees Celsius and 50 degrees Celsius, more preferably between 30 degrees Celsius and 40 degrees Celsius. The temperature control element 39 may comprise, but is not limited to: heating blankets, heating tape, heating rope, or thermally regulated enclosures. The temperature control element 39 may maintain a variance of temperature within the container to within +/−2.0 degrees Celsius, and more preferably to within 0.5 degrees Celsius. The reservoir 35 may improve accuracy of LGE 6 delivery into the secondary container 24 by allowing the LGE 6 to thermally equilibrate prior to delivery into the secondary container 24.

Figure 14:
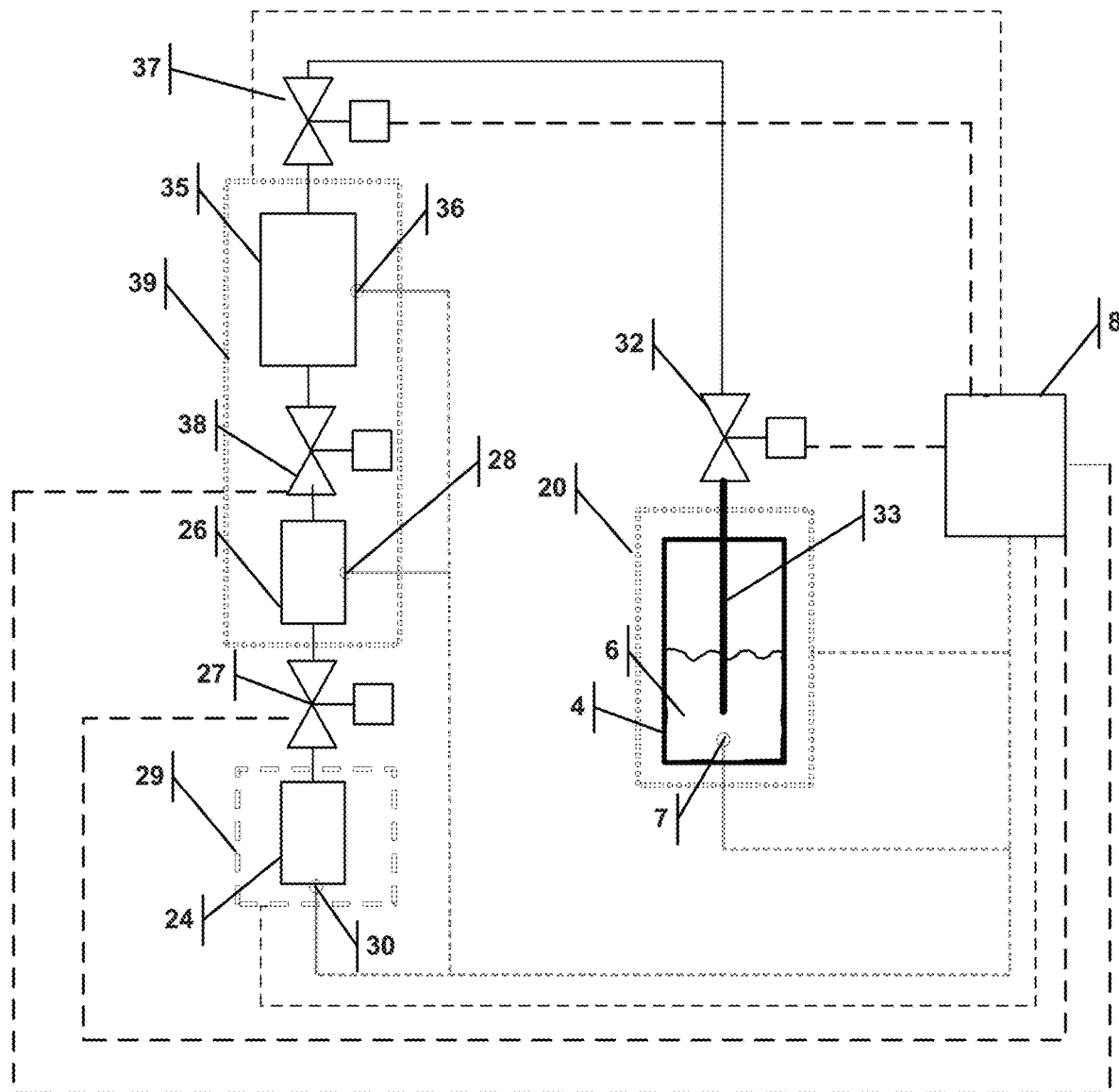
FIG. 14 is a block diagram showing an embodiment of the apparatus for liquefied gas solution dispensing to a secondary container similar to FIG. 10, where the valves are mass flow controllers connected to the processor.

Another embodiment of this invention is illustrated in FIG. 14. Setup 100-14 is similar to the setup 100-13 shown in FIG. 13, except that the valves 37. 38, 27, and 32 are mass flow controllers connected to the processor 8. In this setup 100-14, the processor 8 can actuate the mass flow controllers of valves 32, 37 and 38 to regulate the flow between the container 4 and the reservoir 35. Similarly, the processor can actuate the mass flow controllers of valves 37, 38, and 27 to regulate the flow between the reservoir 35 and the secondary container 24. The regulation of flow can be used in conjunction with the temperature control elements 20 and 39, along with heat sink 29, to maintain the optimal temperature for filling the reservoir 35 and/or for filling the secondary container 24.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An apparatus for dispensing liquefied gas solution, the apparatus comprising:
    a liquefied gas solution container containing the liquefied gas solution comprised of a liquefied gas solvent having a vapor pressure above 100 kPa at a temperature of 293.15 K;
    a first temperature sensor to detect the temperature of the liquefied gas solution container;
    a first temperature control element constructed to heat the liquefied gas solution container;
    a first valve connected to the liquefied gas solution container and to an intermediate loading volume container, wherein the intermediate loading volume container has a predetermined fixed volume constructed to hold and dispense a precise and accurate mass of the liquefied gas solution into the secondary container based on complete filling of the predetermined fixed volume and controlled temperature of the liquefied gas solution;
    a second temperature sensor to detect the temperature of the intermediate loading volume container;
    a second temperature control element constructed to heat the intermediate loading volume container;
    a second valve connected to the intermediate loading volume container and to the secondary container;
    a processor connected to the first and second temperature sensors and the first and second temperature control elements, the processor adapted to perform the following steps:
        a. receive temperature readings from the first temperature sensor and the second temperature sensor;
        b. actuate the first temperature control element based on the temperature readings from the first temperature sensor to maintain the temperature of the liquefied gas solution container at a predetermined temperature or temperature range;
        c. actuate the second temperature control element based on the temperature readings from the second temperature sensor to maintain the temperature of the intermediate loading volume container at the same predetermined temperature or temperature range as the liquefied gas solution container such that the density of the liquefied gas solution in the liquefied gas solution container and the intermediate loading volume container is uniform and known;
    wherein the processor is further adapted to sequentially:
        (i) open the first valve while closing the second valve to completely fill the intermediate loading volume container with the liquefied gas solution from the liquefied gas solution container; (ii) close the first valve to isolate the precise and accurate mass within the intermediate loading volume container; and (iii) open the second valve to transfer the isolated precise and accurate mass of the liquefied gas solution from the intermediate loading volume container into the secondary container, thereby enabling static volumetric dispensing independent of dynamic flow rate measurements.

2. The apparatus of claim 1 wherein the first valve is a mass flow controller connected to the processor, and wherein the processor is adapted to actuate the mass flow controller to adjust the flow of liquefied gas solution from the liquefied gas solution container into the intermediate loading volume container.

3. The apparatus of claim 1 wherein the second valve is a mass flow controller connected to the processor, and wherein the processor is adapted to actuate the mass flow controller to adjust the flow of liquefied gas solution from the intermediate loading volume container to the secondary container.

4. The apparatus of claim 1 wherein the secondary container is an electrochemical device.

5. The apparatus of claim 4 wherein the electrochemical device is a battery or capacitor.

6. The apparatus of claim 1 wherein the predetermined temperature range in step (b) is 313.15 K+/−2 K.

7. The apparatus of claim 1 wherein the predetermined temperature range in step (c) is 303.15 K+/−2 K.

8. The apparatus of claim 1, further comprising:
    a third temperature sensor to detect the temperature of the secondary container;
    a heat sink to cool the secondary container;
    wherein the processor is connected to the third temperature sensor and the heat sink and adapted to perform the step of:
        d. actuating the heat sink based on the temperature readings from the third temperature sensor to maintain the temperature of the secondary container at a third predetermined temperature or temperature range;-lower than the same predetermined temperature or temperature range of the intermediate loading volume container;
    wherein the same predetermined temperature or temperature range in step (c) and the third predetermined temperature or temperature range in step (d) are selected to create a temperature differential between the intermediate loading volume container and the secondary container, thereby driving pressure-differential transfer of the isolated precise and accurate mass of the liquefied gas solution from the intermediate loading volume container into the secondary container.

9. The apparatus of claim 8 wherein the third predetermined temperature range is 293.15 K+/−5 K.

* * * * *